United States Patent [19]
Mayer et al.

[11] 4,203,385
[45] May 20, 1980

[54] FLUID PRESSURE INDICATOR

[75] Inventors: Robert W. Mayer, Hackettstown; Adam Smorzaniuk, West Millington, N.J.

[73] Assignee: Amerace Corporation, New York, N.Y.

[21] Appl. No.: 968,765

[22] Filed: Dec. 12, 1978

[51] Int. Cl.² .............................................. G01L 7/08
[52] U.S. Cl. ..................................... 116/270; 73/715
[58] Field of Search .................. 73/715, 716; 116/266, 116/270, 34 R, DIG. 7, DIG. 41

[56] References Cited

U.S. PATENT DOCUMENTS

| | | | |
|---|---|---|---|
| 1,444,152 | 2/1923 | Hahn | 116/34 R |
| 2,417,449 | 3/1947 | Rubin | 116/DIG. 8 |
| 3,111,930 | 11/1963 | Zipper | 116/34 R |
| 3,489,167 | 1/1970 | Kilmarx et al. | 116/34 R |
| 3,675,722 | 7/1972 | Balmes | 116/270 |
| 3,780,693 | 12/1973 | Parr | 116/270 |

OTHER PUBLICATIONS

Technical Data Sheet 8001 "Pneumatic Pressure Indicator IND-3", Clippard Instrument Laboratory, Inc. 2 pp.

*Primary Examiner*—Donald O. Woodiel
*Attorney, Agent, or Firm*—Richard A. Craig

[57] ABSTRACT

Disclosed herein is a fluid pressure indicator for providing visual indication whether or not the magnitude of a fluid pressure condition is above a predetermined minimum value. The indicator comprises indicating means having an indicating portion and a diaphragm. The indicating means is movable between a first extreme position in which the indicating portion is not visible and a second extreme position in which the indicating portion is visible. The diaphragm has a fixed portion and a resiliently deformable portion which is affixed to the indicating means and movable responsive to changes in the magnitude of the fluid pressure condition. The indicating means is thus movable with the resiliently deformable portion, such that whenever the magnitude of the condition is not in excess of the minimum value, the resiliently deformable diaphragm portion holds the indicating means in its said first position, but a predetermined increase in the magnitude of the condition above the minimum value will deform the deformable diaphragm resiliently, thus to move the indicating means to its said second position.

22 Claims, 6 Drawing Figures

FLUID PRESSURE INDICATOR

BACKGROUND OF THE INVENTION

This invention relates to a fluid pressure indicator for providing visual indication whether or not the magnitude of a fluid pressure condition is above a predetermined minimum value.

More particularly, the inventive indicator is an improvement over a prior art indicator manufactured by Clippard Instrument Laboratory, Inc., 7390 Colerain Road, Cincinnati, Ohio 45239 and sold under the designation "Pneumatic Pressure Indicator IND-3," and hereinafter referred to as "the Clippard indicator." The Clippard indicator is partially disclosed in an undated bulletin designated "Technical Data Sheet 8001" and comprises a black matrix having seven holes therethrough, a bright pin member having seven pin elements located one in each of the seven matrix holes, a plunger having a first end exposed to fluid pressure and a second end confronting the pin member and a transparent bezel providing a viewing end and located in front of the matrix. The Clippard indicator also entails an internal spring which, when the fluid pressure is low, holds the pin member in a first position in which the pin elements are deeply set in the matrix holes and are thus optically masked, but which is resiliently flexed when the fluid pressure is sufficiently high, to permit the plunger to move the pin member to a second position in which the pin elements are displayed in the bezel. When the fluid pressure is reduced the spring returns the pin member to its first position.

The Clippard indicator further has a resilient sealing element seated in a groove around the plunger and in sliding sealing engagement with an internal surface of a metal body in which all of the other parts of the Clippard indicator are located.

The metal body of the Clippard indicator has an aperture which has an end exposed to the fluid pressure source and another end in open communication with the plunger.

The indicator of the present invention is an improvement over the Clippard indicator in that the spring of the Clippard indicator is eliminated as is the requirement for a sealing element in sliding fluid sealed engagement with the metal body. Both of these features of the Clippard indicator are conducive to shortened indicator life, due to possible spring failure or changed operating characteristics over many cycles of operation and due to possible seal failure.

Important objects of the present invention are to provide an indicator which is an improvement over the prior art in that the inventive indicator is both simplified and of more reliable constant operating characteristics over an indefinite number of operating cycles.

The present invention eliminates the spring and the sliding fluid sealed engagement which are required in the Clippard indicator.

The manner in which the present invention achieves the aforesaid objects, and others, will appear hereinafter.

The prior art also teaches a display in which a movable character is located behind a translucent window and hence is invisible when spaced away from the window, but becomes visible when adjacent the window. Greene U.S. Pat. No. 3,372,501 discloses this feature.

The pertinence of the Greene patent will appear hereinafter.

SUMMARY OF THE INVENTION

The inventive fluid pressure indicator provides visual indication whether or not the magnitude of a fluid pressure condition is above a predetermined minimum valve.

Broadly, the inventive indicator comprises indicating means and a diaphragm.

The indicating means has an indicating portion and is movable between a first extreme position in which the indicating portion is not visible and a second extreme position in which the indicating portion is visible.

The diaphragm has a resiliently deformable portion affixed, as by cement, to the indicating means. The resiliently deformable portion is movable responsive to changes in the magnitude of the fluid pressure condition. The diaphragm also has a fixed portion.

Thus, the indicating means is movable with the resiliently deformable portion, such that whenever the magnitude of the fluid pressure condition is not greater than the minimum value, the resiliently deformable portion holds the indicating means in the first (invisible) position, but a predetermined increase in such magnitude above the minimum value will deform the deformable portion resiliently, thus to move the indicating means to its second (visible) position.

In the preferred embodiment, the indicator also comprises a matrix member having a light receiving face which is exposed to view and a rear face and a plurality of holes in open communication with both such faces and the indicating means is a pin member having a plurality of pin elements, each with a free end facing in the same direction as the light receiving matrix member face. The free ends of the pin elements provide the indicating portion of the indicating means. The pin member is movable between the first position in which the free ends of the pin elements are not visible and the second position in which each pin element is in a different one of the holes and the free ends are visible at the light receiving matrix member face. The free ends are preferably also in the holes, but relatively deeply set therein, when the pin member is in the first position.

The light receiving face of the matrix member is dark in color and the free ends of the pin elements are light in color. Conveniently, the dark color permeates the entirety of the matrix member and the bright color permeates the entirety of the pin member.

The indicator further comprises means holding the fixed diaphragm portion stationary with respect to the matrix member.

Furthermore, the indicator includes a body which has means for attachment to a source of the fluid pressure, an aperture in open communication with the resiliently deformable diaphragm portion and adapted for open communication with the fluid pressure source and an internal, circumferentially continuous surface with which the fixed diaphragm portion is in fluid sealed engagement.

The indicator further has a diaphragm retaining member within the circumferentially continuous surface and in fixed location with respect thereto. The retaining member holds the fixed diaphragm portion in such fluid sealed engagement.

The indicator also has a window element having a front face and a rear face having a light diffusing finish and confronting the indicating portion of the indicating means.

When the indicator is unpressurized, the pin member is in the first position and the indicator is substantially dark, due to the fact that the matrix member is dark in color and the free ends of the pin elements are relatively deeply sunk in the matrix member holes and hence substantially invisible. Such substantial invisibility is enhanced by the light diffusing finish of the rear face of the window element. When the indicator is pressurized, the resilient diaphragm portion is deformed toward the matrix member, pushing the pin member ahead of it, until the free ends of the pin elements are in close proximity to the rear face of the window element. In this condition, the bright color of the free ends of the pin elements is vividly displayed.

DESCRIPTION OF THE PREFERRED EMBODIMENT

Figure 1:
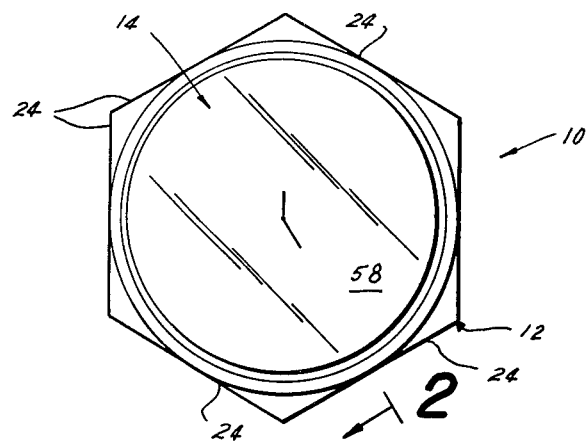
FIG. 1 is a view of the observation end of a preferred fluid pressure indicator embodying the invention, the indicator including a body, a window element, a matrix member, a pin member, a diaphragm and a diaphragm retaining member.
Figure 2:
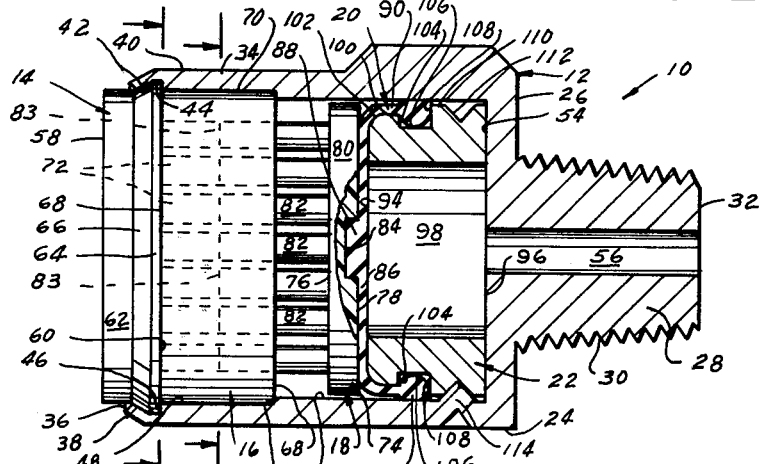
FIG. 2 is a view of the indicator in the unpressurized state, taken essentially on line 2—2 of FIG. 1.
Figure 3:
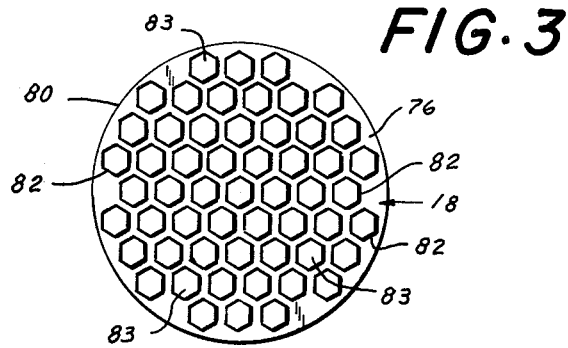
FIG. 3 is a view of the pin member, taken on line 3—3 of FIG. 2.
Figure 4:
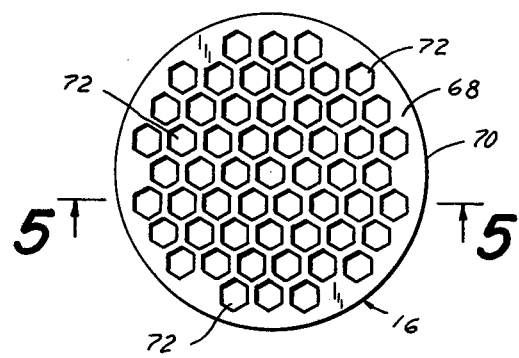
FIG. 4 is a view of the matrix member, taken on line 4—4 of FIG. 2.
Figure 5:
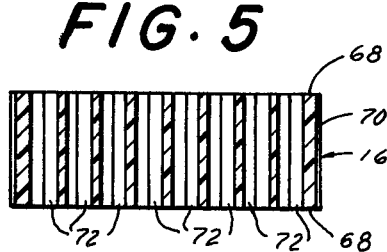
FIG. 5 is a section of the matrix member, taken on line 5—5 of FIG. 4.
Figure 6:
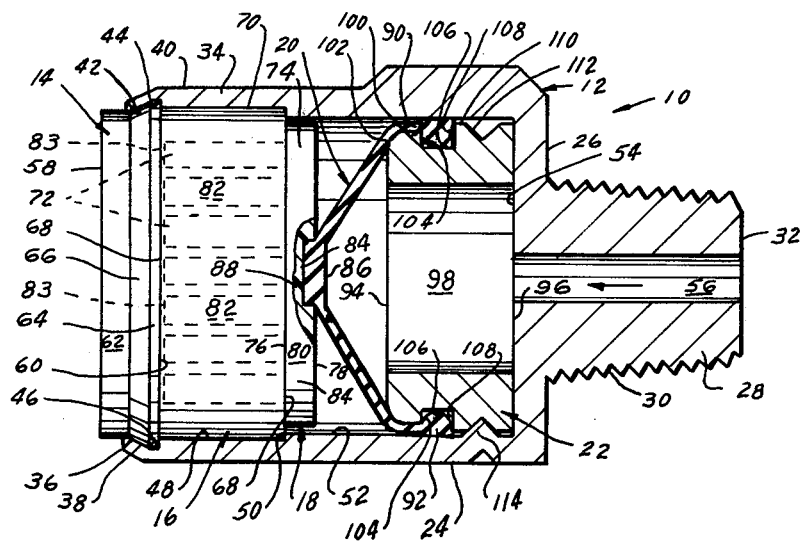
FIG. 6 is a view similar to FIG. 2 but showing the indicator in its pressurized state.

The drawing illustrates a fluid pressure indicator 10 embodying the invention. Indicator 10 provides visual indication of the magnitude of a fluid pressure condition and comprises an assembly of a body 12 (FIGS. 1, 2 and 6), a window element 14 (FIGS. 1, 2 and 6), a matrix member 16 (FIGS. 2, 4, 5 and 6), a pin member 18 (FIGS. 2, 3 and 6), a diaphragm 20 (FIGS. 2 and 6) and a diaphragm retaining member 22 (FIGS. 2 and 6).

Body 12 may be machined from hexagonal brass rod of predetermined across-the-flats dimension. The hexagonal configuration provides body 12, when finished, with external hexagonal wrenching surfaces 24 defining a body axis. At one axial end of wrenching surfaces 24, body 12 has a clamping face 26 perpendicular to and surrounding the body axis. Axially protruding from clamping face 26 is a shank 28 having an external tapered pipe thread 30. The end of shank 28 remote from wrenching surfaces 24 is provided with an annular surface perpendicular to the body axis and defining a first axial end 32 of body 12. Body 12 is adapted to be rotated, by wrenching torque applied to wrenching surfaces 24, so that thread 30 goes into screw threaded, fluid tight engagement with a mating internal tapered pipe thread in a T-connection (not shown) in a fluid line (not shown) or in the end of a fluid line (not shown), in the latter instance with shank 28 extending through a hole in a panel (not shown), thus to mount body 12, and hence indicator 10 as well, on the panel with the panel clamped between clamping face 26 and the fluid line. In what follows, it will be assumed, without limitation, that the fluid is air.

Body 12 also includes an imperforate annular wall 34 extending from work clamping face 26 in the axial direction opposite that of shank 28. The axial end of wall 34 remote from clamping face 26 defines a second end 36 of body 12.

Immediately adjacent end 36, wall 34 has an external frusto-conical surface 38, the diameter of which is smallest at end 36. Wall 34 also has an external cylindrical surface 40 coaxial with the body axis and merging with surface 38 and extending therefrom in the axial direction toward clamping face 26. Wrenching surfaces 24 are located on the exterior of wall 34 axially adjacent clamping face 26, as stated.

Coaxial with external surface 38 and located within surface 38 is an internal frusto-conical surface 42 of substantially the same conical angle, and tapering in the same direction, as surface 38. Wall 34 further has an internal cylindrical surface 44 coaxial with the body axis and merging with surface 42 and extending therefrom in the axial direction toward clamping face 26. Surface 44 terminates in an internal annular shoulder 46 perpendicular to and completely surrounding the body axis.

It is to be noted that initially, i.e., until immediately prior to final assembly, frusto-conical surfaces 38 and 42 are continuations of cylindrical surfaces 40 and 44, respectively.

Coaxial with the body axis and extending from shoulder 46 toward end 32 is an internal cylindrical surface 48 terminating in an annular shoulder 50 perpendicular to and completely surrounding the body axis.

Coaxial with the body axis and extending from shoulder 50 toward end 32 is an internal surface 52 which is initially completely cylindrical and which is terminated by an annular surface 54 perpendicular to and surrounding the body axis.

Finally, body 12 has an internal cylindrical surface or bore 56 coaxial with the body axis and extending from end 32 to surface 54, and providing an aperture in open communication with both end 32 and surface 54.

Window element 14 is molded of clear light transmitting material such as methyl methacrylate and has a plane circular front face 58 and a plane circular rear face 60 of larger diameter than front face 58. Faces 58 and 60 are parallel to each other and are coaxial. Face 58 is a light-receiving face through which indicator 10 is observed in use and provides indicator 12 with an observation end.

For a purpose brought out hereinafter, rear face 60 has a light diffusing finish, whereas front face 58 does not. The light diffusing finish of face 60 may be achieved by roughening the mold surface which forms face 60.

Window element 14 further has three coaxial portions, i.e., a solid cylindrical portion 62 extending from face 58 toward face 60, a solid cylindrical portion 64 extending from face 60 toward face 58 and a solid frusto-conical portion 66 joining portions 62 and 64.

The diameter of rear face 60 (and cylindrical portion 64) is greater than that of cylindrical body surface 48 but slightly less than that of cylindrical body surface 44.

Matrix member 16 is of a dark color, such as black, and may be molded of acetal. Matrix member 16 has two parallel circular end faces 68 joined by an external cylindrical surface 70 which is perpendicular to faces 68 and which has a diameter which is greater than that of cylindrical body surface 52 but slightly less than that of cylindrical body surface 48. The distance between end faces 68 is substantially the same as the axial length of body surface 48, i.e., the distance between shoulders 46 and 50.

Matrix member 16 is provided with a plurality, fifty-five as shown, of closely and uniformly spaced like holes 72 of regular hexagonal configuration and extending between and in open communication with both end faces 68. The axes of holes 72 are parallel to each other and perpendicular to end faces 68.

Matrix member 16 is the same when viewed from either end face 68.

Pin member 18, which, as will be seen, functions as an indicating means, may be molded of acetal and has a base portion 74 having oppositely-facing parallel front and rear circular faces 76 and 78, respectively, joined by an external cylindrical surface 80 perpendicular to faces 76 and 78. The diameter of surface 80 is slightly less than that of body surface 52. Perpendicularly extending from front face 76 are a plurality, fifty-five as shown, of closely spaced like pin elements 82 of regular hexagonal configuration. The axes of pin elements 82 are parallel to each other and perpendicular to face 76. Pin elements 82 are sized and spaced to fit into matrix holes 72 in telescopic relation therewith on a one-for-one basis. Each pin element 82 substantially transversely fills a hole 72. Each pin element 82 has a free end 83 remote from front face 76 and the axial length of each pin element 82, from front face 76 to its free end 83, is substantially the same as, or slightly less than, the distance between matrix member faces 68. Free ends 83 of pin elements 82 lie in a plane parallel to front face 76. Rear face 78 is provided with a central cylindrical recess 84 coaxial with surface 80 and extending part way through base portion 74. Free pin ends 83 provide an indicating portion of member 18 and are of bright color which preferably permeates the entirety of member 18.

Diaphragm 20, which is molded of elastomeric material such as neoprene, is resiliently deformable, and is imperforate and is of generally cup-shaped configuration and will be further described initially in its as molded, unstressed condition, which is substantially shown in FIG. 2. Diaphragm 20 has a central portion 86 defining a diaphragm axis. As shown in FIG. 2, central portion 86 is substantially flat. Axially extending in one direction from the center of one side of central portion 86 is a cylindrical boss 88 of substantially the same diameter and depth as pin member recess 84. Axially extending in the opposite direction from the outer periphery of central portion 86 and smoothly merging therewith, on surfaces of predetermined external and internal radii of curvature, is a circumferentially continuous cylindrical side portion 90 having an external diameter which may be the same as or slightly less than that of body surface 52. As shown, the latter is the case. Except for boss 88, the wall thickness of central portion 86 and side portion 90 is substantially constant. Side portion 90 terminates, axially remote from central portion 86, in a circumferentially continuous bead portion 92 having an internal component lying within the cylindrical envelope of the internal surface of side portion 90 and an external component lying outside the cylindrical envelope of the external surface of side portion 90. In axial section of diaphragm 20, bead portion 92 when unstressed is substantially circular. The internal component of bead portion 92 extends further within the envelope of the internal surface of side portion 90 than the external component of bead portion 92 extends outside the envelope of the external surface of side portion 90. The maximum diameter of the external component of bead portion 92 is, when unstressed, slightly greater than that of body surface 52.

Diaphragm retaining member 22 is annular and may be machined from cylindrical brass rod having a diameter slightly less than that of body surface 52. Member 22 has an axis and, perpendicular thereto, oppositely-facing front and rear parallel surfaces 94 and 96, respectively, and an axial cylindrical bore 98 in open communication with surfaces 94 and 96 and of substantially larger diameter than bore 56 of body 12. Axially adjacent front surface 94, member 22 has a coaxial external cylindrical surface 100 having a diameter the same as, or slightly less than, the diameter of the internal surface of side portion 90 of diaphragm 20. Surface 100 smoothly merges with front surface 94 along a curved surface 102 having approximately the same radius of curvature as the internal radius of curvature of that part of diaphragm 20 which joins central portion 86 and side portion 90. The axial end of surface 100 remote from surface 94 is defined by a plane annular surface 104 facing away from surface 94 and perpendicular to the axis of member 22. The inner periphery of surface 104 is determined by its juncture with an external cylindrical surface 106 coaxial with bore 98. The axial end of surface 106 remote from surface 104 is determined by the juncture of surface 106 with a plane annular surface 108 confronting and parallel to surface 104. The outer periphery of surface 108 is determined by its juncture with an external cylindrical surface 110 which is coaxial with bore 98 and which is slightly less than the diameter of body surface 52 and conveniently may be of the same diameter as the cylindrical rod from which member 22 is machined. Cylindrical surface 110 extends axially from surface 108 to surface 96, except that it is interrupted by an external V-groove 112 which extends completely around member 22 and is axially spaced from both surface 108 and surface 96. The bottom of V-groove 112 lies in a circle which is parallel to surface 96 and each side of V-groove 112 is frusto-conical, making an angle of about 45° with the plane of that circle.

Surfaces 104, 106 and 108 provide member 22 with an external groove extending circumferentially completely around member 22 and located and dimensioned for snug receipt therein of the internal component of bead portion 92 of diaphragm 20, but without substantial deformation of diaphragm 20, with central diaphragm portion 86 lying on surface 94 and covering the adjacent end of bore 98.

Pin member 18, diaphragm 20 and diaphragm retaining member 22 are assembled by snapping the internal component of bead portion 92 into the groove provided by surfaces 104, 106 and 108 with central diaphragm portion 86 lying on surface 94 and covering the adjacent end of bore 98. As stated, in this condition, diaphragm 20 is substantially unstressed. Pin member 18 is brought together with diaphragm 20 with cylindrical recess 84 containing boss 88. These parts are permanently held together as by the use of suitable cement pre-placed in recess 84 and/or on boss 88.

The assembly of pin member 18, diaphragm 20 and diaphragm retaining member 22 is placed in body 12 with surface 96 of member 22 engaging body surface 54. This is accompanied by a slight inward deformation of the external component of bead portion 92 of diaphragm 20 by body surface 52 to provide a fluid tight seal therewith. These parts are permanently held together, with member 22 immovably retained in body 12, by deforming body surface 54 into groove 112 at three equally circumferentially spaced locations centered on alternate ones of hexagonal wrenching surfaces 24, as indicated at 114 in FIGS. 2 and 6.

Matrix member 16 is placed in body 12 with either end face 68 confronting face 76 of pin member base portion 74, until that end face 68 engages body shoulder 50 and the other end face 68, which is a light receiving face, substantially axially coincides with body shoulder 46, with pin elements 82 in matrix member holes 76 in telescopic relation therewith on a one-for-one basis, as aforesaid.

When central diaphragm portion 86 is unstressed, as shown in FIG. 2, free ends 83 of pin elements 82 are located intermediate matrix member faces 68 and face 76 of pin member base portion 74 is spaced from that matrix face 68 which confronts it, a distance which is substantially the same as the distance between the free ends 83 of pin elements 82 and that matrix face 68 which is remote from face 76 of pin member base portion 74.

As assembled, bead portion 92 is fixed and central portion 90 is resiliently deformable.

The assembly of indicator 10 is completed by spinning body wall 34 inwardly, to form frusto-conical surfaces 38 and 42, the latter engaging frusto-conical portion 66 of window element 14, thus to hold the parts together.

In operation, when indicator 10 is in its unpressurized state, i.e., when the magnitude of the fluid line pressure condition is not in excess of a predetermined minimum value, the parts will be as shown in FIG. 2, wherein pin member 18 is in a first extreme position, and when indicator 10 is viewed through window face 58, indicator 10 will be substantially dark. This is due to the fact that matrix member 16 is dark in color and free, brightly colored ends 83 of pin elements 82 are relatively deeply sunk in matrix member holes 72 and hence substantially invisible. Such substantial invisibility is enhanced by the light diffusing finish of rear face 60 of window element 14.

A predetermined increase in the magnitude of the fluid line pressure condition above such predetermined minimum value, as indicated by the arrow in bore 98 in FIG. 6, will cause central diaphragm portion 86 to be resiliently deformed toward matrix member 16, as shown in FIG. 6, pushing pin member 18 ahead of it, until pin member face 76 engages that matrix member face 68 which it confronts, and moving pin elements 82 so that brightly colored free ends 83 thereof are in close proximity to light-diffusing rear face 60 of window element 14. In this pressurized condition, in which pin member 18 is in a second extreme position, when indicator 10 is viewed through window face 58, face 58 will be seen to display the bright color of free ends 83 of pin elements 82, thus providing visual indication that the magnitude of the fluid line pressure condition is at least a predetermined amount above the predetermined minimum value.

When the magnitude of the fluid line pressure condition once more falls to the predetermined minimum value the resiliency of diaphragm portion 86 will cause it to return to its substantially unstressed condition, as shown in FIG. 2, drawing pin member 18 with it, by virtue of the attachment of diaphragm boss 88 and pin member recess 84, so that the parts reassume the condition shown in FIG. 2, in which pin member 18 is in its first extreme position, and free ends 83 of pin elements 82 are not visible.

The light diffusing finish of window element face 60 results in minimization of the required stroke length of pin member 18 relative to matrix member 16, since it minimizes the depth at which free ends 83 of pin elements 82 become invisible.

Various changes will occur to those skilled in the art. For example, matrix member holes 72 and pin elements 82 could have shapes other than hexagonal which makes the best use of the available face area of the indicator. They could be triangular or round, for example. Also in certain cases, it may be feasible to omit window element 14.

A fluid pressure indicator as disclosed herein is well adapted to the attainment of the foregoing objects and others.

The disclosed details are exemplary only and are not to be taken as limitations on the invention, except as those details may be included in the following claims.

The embodiments of the invention in which an exclusive property or privilege is claimed are defined as follows:

1. A fluid pressure indicator for providing visual indication whether or not the magnitude of a fluid pressure condition is above a predetermined minimum value, said indicator comprising a matrix member having a light receiving face which is exposed to view and a rear face and a hole in open communication with both said faces, a pin member including a pin element having a free end facing in the same direction as said light receiving face, said pin member movable between a first extreme position in which said free end is not visible at said light receiving face and a second extreme position in which said pin element is in said hold and said free end is visible at said light receiving face, and a diaphragm having a fixed portion and a resiliently deformable portion affixed to said pin member and movable in response to changes in the magnitude of said fluid pressure condition, said pin member thus movable with said resiliently deformable portion, such that whenever the magnitude of said condition is not in excess of said minimum value, said resiliently deformable portion holds said pin member in its said first position, but a predetermined increase in the magnitude of said condition above said minimum value will deform said deformable portion resiliently, thus to move said pin member to its said second position.

2. The invention of claim 1 wherein when said pin member is in its said first position, said resiliently deformable portion is relatively undeformed.

3. The invention of claim 1 wherein said free end is in said hole when said pin member is in said first position.

4. The invention of claim 1 wherein said light receiving face of said matrix member is dark in color and said free end of said pin element is bright in color.

5. The invention of claim 4 wherein the dark color permeates the entirety of said matrix member and the bright color permeates the entirety of said pin member.

6. The invention of claim 1 wherein said resiliently deformable diaphragm portion is cemented to said pin member.

7. The invention of claim 1 wherein said indicator further comprises means holding said fixed diaphragm portion stationary with respect to said matrix member.

8. The invention of claim 1 wherein said indicator further comprises a body having means for attachment to a source of said fluid pressure, an aperture in open communication with said resiliently deformable portion of said diaphragm and adapted for open communication with said fluid pressure source and an internal, circumferentially continuous surface, said fixed diaphragm portion being in fluid sealed engagement with said circumferentially continuous surface at all circumferential locations thereof.

9. The invention of claim 8 wherein said indicator further comprises a diaphragm retaining member within said circumferentially continuous surface and in fixed location with respect thereto and maintaining said fixed diaphragm portion in said fluid sealed engagement.

10. The invention of claim 9 wherein said fixed diaphragm portion includes a bead having an internal component and an external component and said diaphragm retaining member has a circumferentially continuous groove confronting said circumferentially continuous surface, said internal component being in said groove and said external component being deformed against said circumferentially continuous surface to effect said fluid sealed engagement.

11. The invention of claim 10 wherein said diaphragm retaining member has an additional groove confronting said circumferentially continuous surface which is deformed inwardly into said additional groove to effect said fixed location of said diaphragm retaining member with respect to said circumferentially continuous surface.

12. The invention of claim 1 wherein said indicator further comprises a window element having a front face and a rear face, said rear face having a light diffusing finish and confronting said indicating portion.

13. The invention of claim 12 wherein said front and rear faces of said window element are parallel to each other.

14. The invention of claim 1 wherein said matrix member has a plurality of holes in open communication with both said faces and said pin member includes a plurality of said pin elements and in said second position each said pin element is in a different one of said holes.

15. The invention of claim 14 wherein said plurality of holes and said plurality of pin elements are equal in number and wherein said free ends are in said holes but spaced from said light receiving matrix face when said pin member is in its said first position.

16. The invention of claim 14 wherein said indicator further comprises a body having means for attachment to a source of said fluid pressure, an aperture in open communication with said resiliently deformable portion of said diaphragm and adapted for open communication with said fluid pressure source and an internal, circumferentially continuous surface, and a diaphragm retaining member within said circumferentially continuous surface and in fixed location with respect thereto and maintaining said fixed diaphragm portion in fluid sealed engagement with said circumferentially continuous surface at all circumferential locations thereof.

17. The invention of claim 15 wherein said indicator further comprises a body having means for attachment to a source of said fluid pressure, an aperture in open communication with said resiliently deformable portion of said diaphragm and adapted for open communication with said fluid pressure source and an internal, circumferentially continuous surface, and a diaphragm retaining member within said circumferentially continuous surface and in fixed location with respect thereto and maintaining said fixed diaphragm portion in fluid sealed engagement with said circumferentially continuous surface at all circumferential locations thereof.

18. The invention of claim 17 wherein said fixed diaphragm portion includes a bead having an internal component and an external component and said diaphragm retaining member has a circumferentially continuous groove confronting said circumferentially continuous surface, said internal component being in said groove and said external component being deformed against said circumferentially continuous surface to effect said fluid sealed engagement.

19. The invention of claim 18 wherein said diaphragm retaining member has an additional groove confronting said circumferentially continuous surface which is deformed inwardly into said additional groove to effect said fixed location of said diaphragm retaining member with respect to said circumferentially continuous surface.

20. The invention of claim 19 wherein said indicator further comprises a window element having a front face and a rear face, said rear face having a light diffusing finish and confronting said light receiving face of said matrix member.

21. The invention of claim 20 wherein said rear face of said window element is substantially coincident with said light receiving face of said matrix member.

22. The invention of claim 21 wherein said free ends of said pin elements are substantially coincident with said light receiving face of said matrix member when said pin member is in its said second position.

* * * * *